Nov. 25, 1969 M. G. HARMAN 3,480,927

ASSOCIATIVE MAGNETIC MEMORY DEVICES AND MATRICES

Original Filed March 6, 1963 3 Sheets-Sheet 1

INVENTOR
MICHAEL G. HARMAN

BY Louis A. Kline
John J. Callahan
Glenn W. Bowes

HIS ATTORNEYS

ASSOCIATIVE MAGNETIC MEMORY DEVICES AND MATRICES

Original Filed March 6, 1963 3 Sheets-Sheet 2

INVENTOR
MICHAEL G. HARMAN
BY Louis A. Kline
John J. Callahan
Glenn W. Bowes
HIS ATTORNEYS INVENTOR
MICHAEL G. HARMAN
BY Louis A. Kline
John J. Callahan
Glenn W. Bowes
HIS ATTORNEYS United States Patent Office 3,480,927

Patented Nov. 25, 1969

3,480,927

ASSOCIATIVE MAGNETIC MEMORY DEVICES AND MATRICES

Michael Godfrey Harman, London, England, assignor to The National Cash Register Company, Dayton, Ohio, a corporation of Maryland Original application Mar. 6, 1963, Ser. No. 263,271, now Patent No. 3,341,828, dated Sept. 12, 1967. Divided and this application July 12, 1967, Ser. No. 652,818

Claims priority, application Great Britain, Mar. 30, 1962, 12,264/62

Int. Cl. G11b *5/00*

U.S. Cl. 340—174 4 Claims

ABSTRACT OF THE DISCLOSURE

A magnetic storage device is formed with a plurality of major apertures, the circumference of each major aperture being a magnetic flux storage path. The storage flux is established in one direction or the other, corresponding to a "1" or a "0" storage state, by write means that are individually coupled to each major aperture.

Between each pair of major apertures is a minor aperture, and between each minor aperture and each major aperture is an interrogate and readout aperture. The interrogate and readout apertures are each linked by a sense winding, and the minor apertures are each linked by a bias winding.

A multiple-aperture write branch for magnetic storage devices is provided, by which, through coincident energization of an enable winding that links all of the apertures, and one of a number of individual write windings each of which passes through only one of the apertures, the storage state of the magnetic storage device is established.

A magnetic write branch having a number of first write apertures with individual write windings coupled to each first write aperture is disclosed. A plurality of second write apertures are positioned intermediate the first write apertures and a storage loop. An enable winding passes through each aperture, and current through the enable winding and the write winding establishes the magnetic flux storage state of the storage loop.

This application is a division of United States patent application Ser. No. 263,271, filed Mar. 6, 1963, now Patent No. 3,341,828, Michael Godfrey Harman, inventor.

This inventon is concerned with matrices of magnetic memory elements or devices in which it is possible to search for a word having any specified pattern of bits in one or more sets of bit positions. It is also concerned with magnetic elements and devices particularly suitable for use in such matrices.

In certain computer applications, it is necessary to operate on "words" having one or more reference number sections (often termed "tags") and a data section. This may give rise to many problems of organization of the memory. For example, if a reference number in a word may lie anywhere between 0 and 999 but only 100 different reference numbers are actually used, it would be absurd to provide a different address for each possible reference number, as this would mean that only 10% of the memory would actually be used. If a memory with only 100 addresses were used, then an average of 50 trials would be required to find a desired word if the reference numbers were disordered, and, even if the reference numbers were ordered sequentially, several trials would be required on average to find a desired word.

The ordering of words according to their reference numbers may be difficult or impossible; for example, if the reference numbers are changeable or if each word has several different reference numbers. It is therefore evident that a memory is desirable in which a reference number may be applied to all addresses in parallel, an indication being obtained of the addresses, if any, in which those words with the desired reference numeral are stored. Such a memory is termed an associative memory.

The requirements for the memory elements used in associative memories are as follows. Each element must be capable of having "0" or "1" written into itself; must be non-destructively readable by first or second search or interrogation pulses (hereinafter referred to as Interrogate "0" and Interrogate "1" pulses respectively), producing in response thereto an output signal on a detector line when a "1" or "0," respectively, is stored in the element; and must be readable, preferably non-destructively, by a read pulse, producing in response thereto an output signal on a sense line when a "1" is stored. The searching operation is described as interrogation; an Interrogate "0" or Interrogate "1" is applied to the memory element accordingly as the corresponding bit of the reference number is "0" or "1." Thus it is seen that an output signal on the detector line is indicative of a mismatch between the stored bit and the corresponding bit of the reference number. In the associative memory matrix, each word has a detector line coupled to all the elements—i.e., all the bits thereof—so that signals are produced on all the detector lines except those coupled to words having the desired reference number.

Schemes for using magnetic cores for constructing such elements have become known, in which two distinct cores are used in each element. Thus the use of two toroidal cores operated in a biassed and non-destructive mode in such an element is described in an article entitled "A Magnetic Associative Memory," by J. R. Kiseda, H. E. Peterson, W. C. Seelbach, and M. Teig, at pages 106 to 122 of the I.B.M. Journal of Research and Development, volume 5, No. 2, April 1961. It is also known to use a pair of two-hole transfluxors for such a memory element. In effect, in both these schemes, one of the magnetic cores is switched from its reference state when a "0" is to be stored and the other device switched from its reference state when a "1" is to be stored.

It is the object of the present invention to provide a single magnetic device operable as a memory element of the type described.

Thus, according to the present invention, there is provided a device constructed of square-loop magnetic material adapted to store a binary "0" or "1," and having an Interrogate "0" winding, an Interrogate "1" winding, and a detector winding so coupled thereto that an output pulse is induced on the detector winding if the Interrogate "0" or Interrogate "1" winding is energized while the device is storing "0" or "1," respectively, wherein said stored "0" or "1" is represented by the direction of flux around a single flux path to which all said windings are coupled.

The invention will be described in detail with reference to the accompanying drawings, in which.

Figure 1:
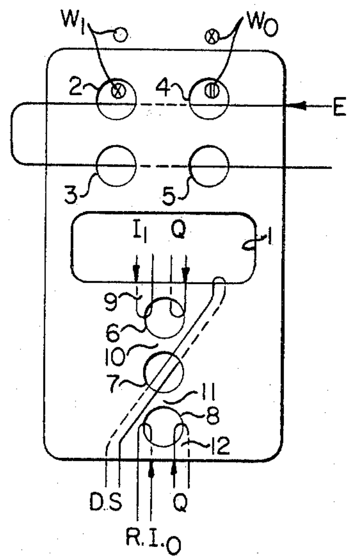
FIGURE 1 shows one form of magnetic element.
Figure 4:
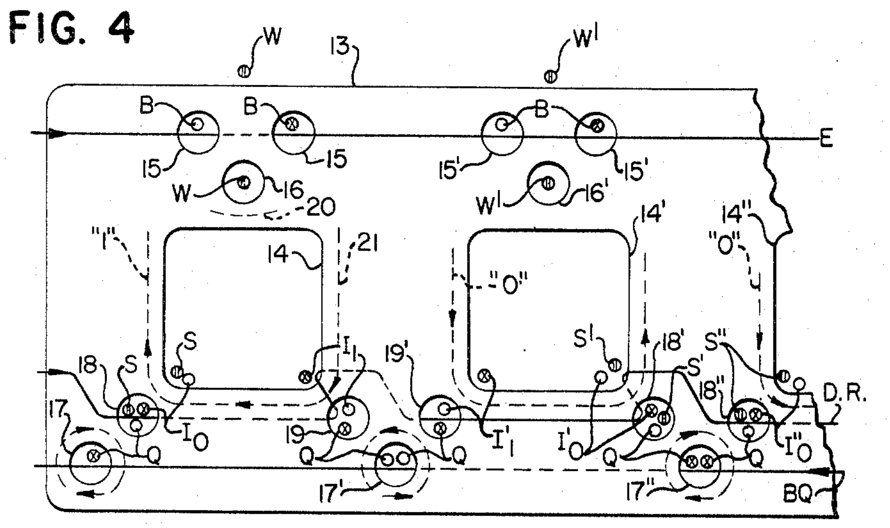
FIGURE 4 shows an alternative form of magnetic device.

In FIGURES 1 and 4, lines which carry unidirectional drive currents have the directions of these currents indicated on them by the usual arrowhead convention, even though they may be energized only by intermittent pulses.

Figure 2:
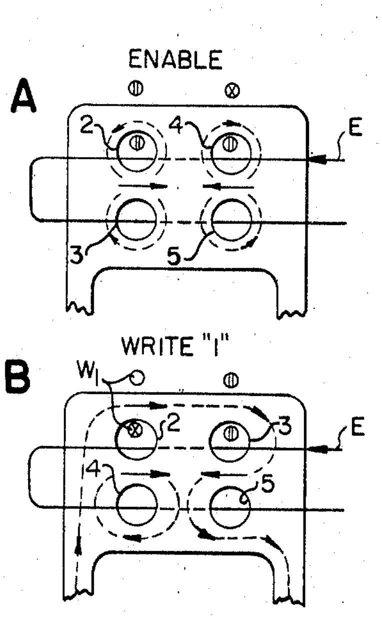
FIGURES 2A and 2B show the method used for writing in the element of FIGURE 1.

In FIGURE 2, however, arrowheads indicate currents actually flowing in the condition under discussion.

In FIGURE 1, a magnetic element consisting of a sheet of ferrite of uniform thickness is shown. The ferrite must have a squareness ratio $B_r/B_m$ substantially equal to one, but the slope of the steep parts of its hysteresis loop is not significant, since coincident current techniques are not used. The element consists basically of a loop of material around a central aperture 1, the upper portion of the loop having four apertures used for writing and the lower portion having three apertures used for reading and interrogation.

The write portion of the loop contains two pairs of apertures 2 and 3, 4 and 5. Each of these pairs of apertures divides the loop into three legs of equal width, say $x$, the width of the loop at its narrowest point being not less than $x$. The distances between apertures 2 and 4, between apertures 3 and 5, and between each of apertures 3 and 5 and the outer boundary of the element, are all at least $2x$. An enable winding E is coupled to the legs between apertures 2 and 3 and between apertures 4 and 5 in opposite directions, as shown. A write "1" winding $W_1$ and a write "0" winding $W_0$ are coupled to the legs between apertures 2 and 4, respectively, and the outer boundary of the element; the wires of these windings are shown in cross section in FIGURE 1.

In FIGURE 2, the operation of these windings is shown. FIGURE 2A shows the result of energizing the enable winding E; MMF's are produced in the legs between apertures 2 and 3 and between 4 and 5, as indicated by the arrows, and flux loops are formed around some or all of these apertures somewhat as shown by the dashed lines. No flux, however, is induced around the central aperture 1. Similarly, it is clear that energization of either one of the write windings $W_0$ and $W_1$ will result in establishing a flux loop around apertures 4 or 2, respectively, the MMF's from these two windings being directed from right to left and from left to right respectively, no flux being induced around aperture 1. The simultaneous energization of the enable winding E and either one of the write windings, however, establishes a flux path encircling the central aperture 1, as is illustrated in FIGURE 2B for the energization of winding $W_1$. Subsequent energizations of any of the three windings E, $W_0$, and $W_1$ may disturb the flux pattern around the apertures 2 to 5, but will not affect the flux passing around the major aperture 1, unless of course the enable winding is energized simultaneously with one of the write windings. It will be realized that the dashed flux paths are not necessarily exact representations of the actual behavior of the flux.

The lower part of the loop about the central aperture 1 of the element of FIGURE 1 includes three apertures 6, 7, and 8. These apertures divide the loop into four legs 9, 10, 11, and 12, as shown, each of width $x/2$. A winding R.$I_0$, which carries both read and Interrogate "0" pulses and a winding $I_1$, which carries Interrogate "1" pulses, are coupled to legs 12 and 9 respectively, and each of these two legs also has a restore winding Q coupled thereto. A winding D.S acting as both the detector winding and the sense winding is coupled to the whole loop in a figure-of-eight manner, passing through aperture 7 as shown. The directions of the currents applied to these windings are indicated by the arrowheads thereon.

Figure 3:
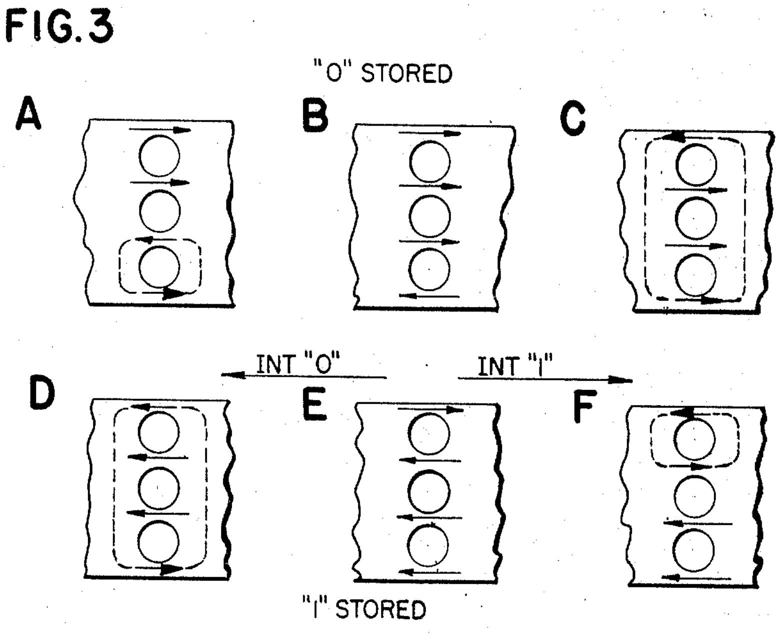
FIGURES 3A to 3F show the method used for reading from the element of FIGURE 1.

The operation of the read and interrogate windings R.$I_0$ and $I_1$ will be described with reference to FIGURE 3. During writing, the restore windings Q are energized to give MMF's from left to right in leg 9 and from right to left in leg 12. Hence the flux from the write and enable windings passes through legs 10 and 11 in its path around the central aperture 1. Thus the remanent flux is as illustrated in FIGURES 3B and 3E for stored "0" and "1" respectively.

For interrogation, one or other of the windings R.$I_0$ and $I_1$ is energized to produce an MMF opposed to the flux in the leg coupled thereto. Thus, energization of winding $I_1$ produces an MMF from right to left in leg 9, and a reversal of the flux therethrough. This flux reversal occurs around a loop including leg 12 or leg 10 according as "0" or "1" is stored, as illustrated in FIGURES 3C and 3F respectively: the applied MMF is indicated by the heavy headed arrow. Similarly, energization of winding R.$I_0$ produces a left-to-right MMF in leg 12, and a flux reversal loop including leg 11 or leg 9 according as "0" to "1" is stored, as illustrated in FIGURES 3A and 3D respectively.

It is evident that energization of the winding $I_1$ induces a signal on the winding D.S only if a "0" is stored, and similarly winding R.$I_0$ can induce output signals only if a "1" is stored. It is clear also that the detector and sense winding D.S may be applied in other ways: it may, for example, be coupled only to legs 11 and 12, passing only through aperture 7. It should be noted, for example from a comparison of FIGURES 3C and 3D, that the polarity of the signal induced on the sense line is independent of whether a "0" is read by winding $I_1$ or a "1" by winding R.$I_0$.

After interrogation, both the restore windings Q are energized. This results in the flux patterns of FIGURES 3B or 3E being restored according as a "0" or a "1" was originally stored.

For reading the stored bit, a read pulse is applied on winding R.$I_0$, and an output pulse is induced on winding D.S if the stored bit is a "1." This readout must be followed by energization of the restore windings Q.

The utilization of these elements in a matrix is straightforward. Each elements is modified by the provision of two separate windings each identical to the windings R.$I_0$, one being used purely as the read winding and the other purely as the Interrogate "0" winding; and of two separate windings each identical to the windings D.S, one being used purely as a detector winding and the other purely as the sense winding. Each bit line will be provided with one Interrogate "0" winding and one Interrogate "1" winding coupled to all elements in the line, one or other of these two windings being energized according as the corresponding bit of the desired reference word is "0" or "1." Each word line will have a single detector winding coupled to all the elements therein, the output being used, for example, to set to "0" a corresponding flip-flop to indicate that the word in the respective word line does not have the required reference number. The bit lines may be energized sequentially or simultaneously; simultaneous energization is possible because the detector winding signal polarity is independent of the bit being read. Each word line will also be provided with a read winding and each bit line with a sense winding for word readout, and a write "0" and a write "1" winding will be provided for each bit line and an enable winding for each word line to permit information to be written into the matrix. All the restore windings will be connected in series and energized during each write step and after each interrogate or read step.

If the elements are made of suitable material, with steep sides to the hysteresis loop, the four write apertures can be eliminated and writing achieved by the use of standard half-select current techniques. In such a case, it is desirable for the inner and outer perimeters of the flux path around the central aperture to be approximately equal: this may be achieved by spacing the three read apertures around the main loop. The dimensions to be maintained are: the four legs 9 to 12 of width exactly $x$; the distances between aperture 6 and the inner periphery of the main loop, and between aperture 8 and the outer periphery of the main loop, at least $3x$; the two distances between aperture 7 and the inner and outer peripheries of the main loop, at least $2x$; and the width of the main loop, exactly $2x$. In such a case, care must be taken that the perimeter of the main loop is too great for any flux to switch around it during interrogation or readout. It will be realized, of course, that if the standard half-select current technique is used, the elements will have to be cleared (i.e., driven to "0") before writing "1" in the desired elements.

It will be realized that the elements are suited for incorporation in a single strip for each bit line or for each word. Such a strip may have the windings in its plane "printed" by any suitable technique: such techniques are described, for example, by A. Guditz, "Three-Dimensional Printed Wiring," Electronics, pages 160 to 163, June 1, 1957, and Jan A. Rajchman, "Ferrite Apertured Plate for Random-Access Memory," Proc. EJCC, December 1956, pages 107 to 115. It may be noted that multi-turn windings can be printed, reducing the driving current needed while increasing the inductance of the windings, and also that several windings can be printed passing through the same aperture. To form a matrix, several such strips are placed side by side with corresponding apertures in alignment, and the windings running perpendicular to the strips are then passed through the corresponding apertures in each strip.

In FIGURE 4 there is shown in part a plurality of associative memory elements constructed as an integral strip, suitable for use with the above-mentioned printed wiring techniques.

A continuous strip 13 of ferrite has a pluality of major apertures 14, 14′, 14″ spaced along it. Above each major aperture is a group of three apertures 15, 15, 16; 15′, 15′, 16′ used for writing; i.e., establishing a clockwise or counter-clockwise flux around the respective major aperture. Between adjacent pairs of major apertures, and beyond each end major aperture (only one of which, 14, is shown), minor apertures 17, 17′, 17′ are placed, and between each of the minor apertures and the adjacent major apertures are placed interrogate apertures 18, 19, 19′, 18′, 18″ as shown.

The diagram of FIGURE 4 is drawn approximately to scale, and the distances between adjacent apertures, and between the boundary of the device and the apertures nearest thereto, are all equal, say $x$. The distances between the pairs of apertures 14, 14′; 14′, 14″; 15, 15; 15′, 15′; 19, 19′; and 18′, 18″ are all at least $2x$. The perimeter of each of the large apertures 14, 14′ exceeds the total perimeter of the two adjacent interrogate apertures. The following explanation of the device will make clear any remaining dimensional limitations.

The writing of information into the device will be explained first. For writing, the several major apertures are effectively isolated from each other by the construction of the strip, and only aperture 14 will be considered here in detail, writing around the other apertures being performed in exactly the same manner. Through the aperture 15 there passes a bias winding B, having a steady bias current therethrough effective to maintain a saturated flux loop about each aperture 15. Through these apertures an enable winding E is also passed, which is energizable with a current equal and opposite to the bias current. Through aperture 16 and around the boundary of the device a write winding W passes, connected to a bipolar driver.

Normally, therefore, the net flux passing between aperture 16 and the boundary of the device is zero. Energization of the enable winding alone will nullify the MMF's due to the bias winding, but have no effect on the flux distribution; and energization of the write winding alone will produce MMF's insufficient to overcome the effect of the bias winding current, and thus have no effect on the flux distribution. However, when both the enable winding and the write winding are energized, the enable winding will nullify the effect of the bias current, and the MMF due to the write winding will be effective to switch the flux between aperture 16 and the boundary of the strip to a direction dependent on the polarity of the current in the write winding, the effective width of the path through which this flux passes being $2x$.

This flux divides into equal parts passing between apertures 14 and 16 along path 20, and around aperture 14 along path 21. On the termination of the write and/or enable winding currents, the net flux between aperture 16 and the boundary of the device returns to zero, and the flux through the shorter of the two paths—i.e., through path 20—is reversed. Thus the flux through paths 20 and 21 around aperture 14 can be established in either direction; the counter-clockwise and clockwise directions are chosen to correspond to "0" and "1," respectively. The diagram shows apertures 14, 14′, and 14″ storing "1," "0," and "0" respectively.

It is necessary to insure that the path 21 does not pass outside either of the interrogate apertures 18 and 19. Restore windings Q are therefore provided, coupled to each of the two legs between each minor aperture and the two interrogate apertures adjacent thereto and these windings are energized during writing to produce alternately clockwise and counter-clockwise flux paths around the minor apertures 17, 17′, 17″ as shown. Also provided is a permanently energized winding BQ, which also produces the same alternately clockwise and counter-clockwise MMF's and fluxes. These MMF's and fluxes then insure that the fluxes induced around the major apertures 14, 14′, and 14″ during writing do not make undesired excursions around the interrogate and/or the minor apertures.

For interrogation, the restore windings are de-energized. Two interrogate windings $I_0$ and $I_1$ are provided, each coupled to a path 21 about aperture 14, and associated with minor flux loop apertures 17 and 17′ respectively. Winding $I_0$ passes through apertures 14 and 18, and winding $I_1$ passes through apertures 14 and 19. Interrogate windings $I_0'$ and $I_1'$ respectively are similarly associated with major aperture 14′, and the interrogate winding $I_0''$ for major aperture 14″ is also shown. All Interrogate "0" windings are associated with clockwise minor aperture flux loops, and all Interrogate "1" windings are similarly associated with counter-clockwise minor aperture flux loops. It is therefore seen that the flux around an interrogate aperture, such as 19, threaded by an Interrogate "1" winding will be entirely clockwise if the associated major aperture is storing a "0," and the flux around an interrogate aperture, such as 18, threaded by an Interrogate "0" winding will be entirely counter-clockiwise if the associated major aperture is storing a "1." Hence the Interrogate "0" and Interrogate "1" windings are energized to give clockwise and counter-clockwise MMF's, respectively, around the respective interrogate apertures through which they are threaded. A flux reversal around the respective aperture will therefore occur only if the flux through the leg to which the read winding is coupled is not already directed counter-clockwise or clockwise, respectively, around the associated interogate aperture. That is, a flux change will occur if and only if an Interrogate "0" or an Interrogate "1" winding is energized and a "1" or a "0," respectively, is stored around the associated major aperture; and such a flux change will occur as a flux reversal around the associated interrogate aperture.

In order to detect such flux change, detector winding D.R is provided, coupled to the same legs as the Interrogate "0" and Interrogate "1" windings in such a manner that the same polarity impulse is induced by flux reversal around any read-out aperture. The winding D.R therefore passes through the interrogate apertures 18, 19, 19′, 18′, 18″ as shown.

The detector winding D.R is also used as the read winding. It is clear that a current on this winding will have the same effect as simultaneous interrogate "0" and interrogate "1" pulses applied to all elements along the strip. Flux will therefore be switched around one or another of the two interrogate apertures associated with each major aperture when the winding D.R is energized by a read current. It is necessary to sense this flux change, and hence sense windings S, S′, S″ are provided, coupled to the strip in the same manner as the windings $I_0$, $I_0'$, $I_0''$ respectively.

The restore windings Q, coupled to the legs between the interrogate and readout apertures and the minor apertures 17, 17′, and 17″, are used to restore the flux pattern to the state in which it was before interrogation or readout. These windings are therefore energized after interrogation or readout has occurred, and provide counterclockwise and clockwise MMF's around the interrogation apertures associated with Interrogate "0" and Interrogate "1" windings respectively. If no flux change has occurred around an interrogate aperture during interrogation or readout, the flux in the leg to which the restore winding is coupled will already be flowing in the same direction as the MMF applied by the restore winding; if a flux reversal has occurred, the restore winding will reverse the flux once more, returning it to the state in which it was before interrogation or readout. It will be noted that no flux change can occur around the minor apertures 17, 17′, 17″, since the winding BQ maintains the flux through the legs between these apertures and the boundary of the device unchanged.

It is evident that at this point, therefore, a memory matrix comprising a plurality of similar strips 13, with individual windings E, D.R, and BQ, and with common windings W. B, $I_0$, $I_1$, and Q for each set of corresponding major apertures, can be constructed, and that, by energizing the $I_0$ or $I_1$ windings for the appropriate bit positions, signals will be induced on all D.R lines except those corresponding to the strips storing words with the required reference number. For word readout, the line D.R of the selected strip has a read pulse applied to it to produce the same MMF's as the interrogate windings. This may be done before the restore windings are energized, or after the restore windings have been energized and de-energized. It will be necessary, of course, to energize the restore windings after word readout; this may often be done simultaneously with the writing of a new word into the matrix. It will be noted that, during word readout, flux may be reversed around some apertures associated with Interrogate "1" windings, but this reversal is not significant to the operation of word readout. Signals will be induced on those of sense lines S, S′, S″ coupled to major apertures storing "1" in the selected strip.

The arrangement of the circuitry required for driving a matrix of the strips of FIGURE 4 will now be described with reference to FIGURES 5A and 5B.

Figure 5A:
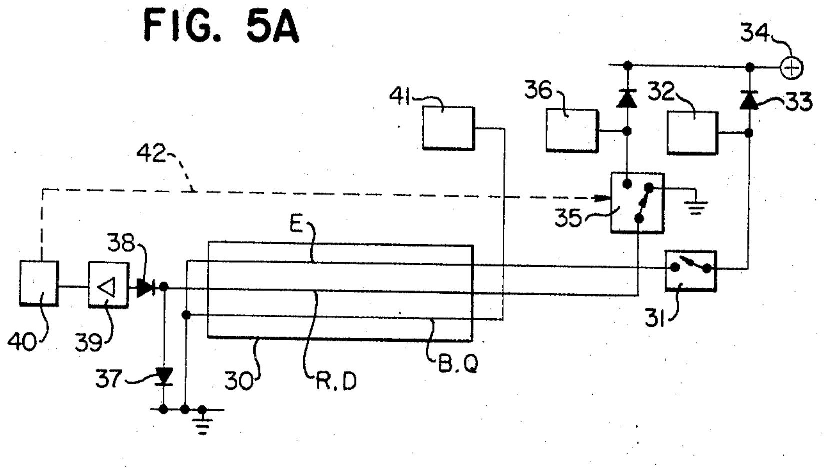
FIGURES 5A and 5B show the circuitry required for a matrix constructed of the devices of FIGURE 4.

FIGURE 5A shows, in block form, the windings and circuits required for a single strip; i.e., word line. The strip is shown as a rectangular 30, with enable, read and detector, and bias lines E, R.D, and BQ respectively, these lines being threaded through the strip as shown in FIGURE 4. Enable line E is used for writing, and is connected through a write driver 31 to a constant current source 32. Enable driver 31 and other drivers are here shown schematically as mechanical switches, but, in practice, suitable electronic switches would of course be used. A single constant current source 32 is common to all enable drivers, such as 31, since during writing only one enable line will be energized. The constant current source 32 is connected through a diode 33 to a constant voltage source 34, which provides a path through which the output of the constant current source can flow when no enable driver is being operated.

The read and detector line R.D is used for both readout and for detecting any mismatch during interrogation. One end of this line is connected to a read driver 35, which includes a switch which connects line R.D to either earth or a constant current source 36. For readout, line R.D is connected to source 36; otherwise, it is grounded through switch 35. Source 36, like source 32, is common to all read drivers and is connected to voltage source 34 through a diode.

The other end of line R.D is connected through diode

37 to ground and through diode 38 to a sense amplifier 39 feeding a flip-flop 40. Diodes 37 and 38 are poled so as to permit and oppose, respectively, the flow of current from source 36 along line R.D. Thus the sense amplifier 39 is effectively isolated from line R.D during readout. Now the switching of flux in the strip 30 during readout is in the same direction as the switching of flux therein during interrogation, while line R.D is a drive line during readout and a detector—i.e., sensing—line during interrogation. The current induced in line R.D during interrogation will therefore tend to flow in the opposite direction to the readout drive current. During interrogation, therefore, the current induced in line R.D by any mismatch between the reference number of the word stored in strip 30 and the desired reference number will flow through diode 38 and to ground through driver 35, diode 37 being back biassed. Thus the signal in line R.D during interrogation will be applied to the sense amplifier 39, which is preferably strobed to reduce the effects of noise, etc.

Sense amplifier 39 provides an output which is applied to flip-flop 40. A corresponding flip-flop is provided for each word line—i.e., strip—and all these flip-flops are set to "1" just before interrogation. An output from sense amplifier 39, indicative of mismatch, is applied to flip-flop 40 to clear it to "0"; thus words with the required reference number are indicated after readout by those flip-flops still set after interrogation. For readout of the located words, the read drivers 35 will be controlled by the flip-flops 40 through suitable gating circuitry, this control being indicated by the dashed line 42.

Bias current line BQ carries a constant bias current and is connected between ground and constant current source 41. The corresponding lines for all strips will be connected serially, with a single source 41 being common to all strips.

Figure 5B:
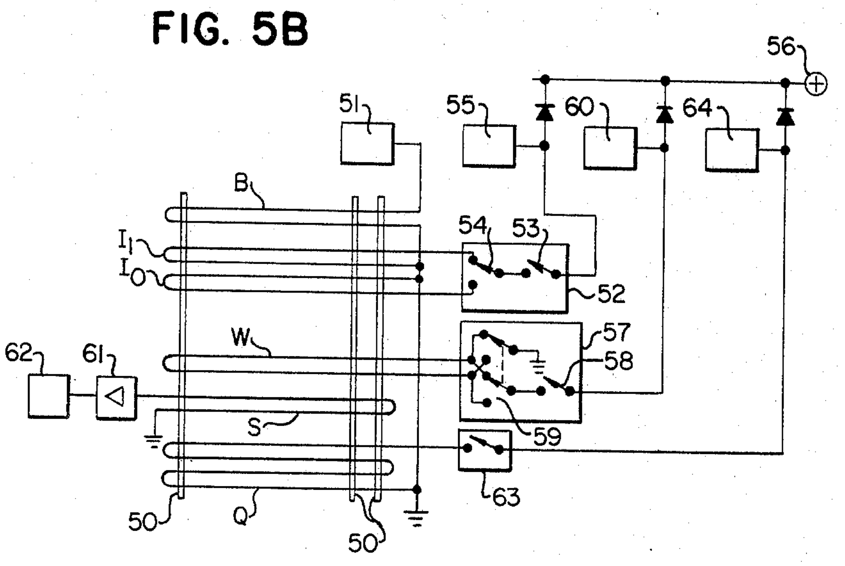

FIGURE 5B shows, in block form, the windings and circuits required for a single bit line; i.e., a line of corresponding elements taken one from each strip, using the strips of FIGURE 4. Three strips are shown end on, as 50, and the bias, Interrogate "1," Interrogate "0," write, sense, and restore lines B, $I_1$, $I_0$, W, S, and Q respectively passing through them, the exact manner in which these lines pass through the strips being shown in FIGURE 4.

Bias winding B is connected to a constant current source 51, a single source 51 being provided and the bias lines B of all bit lines being serially connected together. These lines may be connected in series with the bias lines BQ running along the strips, so that only source 41 (FIGURE 5A) is required for all bias lines.

Interrogate lines $I_0$ and $I_1$ are connected to an interrogate driver 52 containing two switches. Switch 53 is closed for interrogation if the bit line corresponds to a bit in the reference number, but remains open if it corresponds to a bit in the data portions of the words. Switch 54 feeds line $I_0$ or $I_1$ according as the corresponding bit of the reference number is "0" or "1." The interrogate driver is fed from a constant current source 55 connected through a diode to voltage source 56 through a diode; the voltage source 56 may be the same voltage source as that shown as 34 in FIGURE 5A. A single constant current source 55 or a separate source for each bit line will be required accordingly as interrogation is done in a serial or a parallel mode; i.e., bit by bit or all bits at once.

Write line W is fed from a write driver 57 including two switches 58 and 59. Switch 58 is closed for writing, and switch 59 is controlled by the bit to be written, so as to provide a positive or negative current through line W. Write driver 57 is fed from a constant current source 60, connected through a diode to voltage source 56. A single source 60 common to all write drivers or a separate current source 60 for each driver will be provided accordingly as writing is done in a serial or a parallel mode. It will be realized, of course, that interrogation may be done in the serial mode and writing in the parallel mode, or vice versa.

The sense line S is connected to a sense amplifier 61, which is preferably strobed to reduce the effects of noise, etc., and which in turn feeds a flip-flop 62. A separate sense amplifier and flip-flop provided for each bit line, the flip-flops 62 forming the output word register.

The restore line Q is connected to a restore driver 63 fed from a constant current source 64 connected through a diode to voltage source 56. Restore driver 63 contains a switch which is closed for restoration; the restore lines Q of all bit lines are connected in series, a single restore driver 63 and source 64 being provided.

In many instances, it will be known that there is only one word for each reference number. In such cases, it is possible to reduce the number of indicator flip-flops from $n$ to about $2\sqrt{n}$, where $n$ is the number of word addresses. This is achieved by a system similar to the "linear select" or "driver-grounder" method of driving core matrices. However, in the present case, all but one of the sense lines will have signals induced on them during the search step. Diodes are therefore placed in the sense lines with such a polarity that they oppose the sense line signals, and a small signal (equal to the sense line signal occurring when the desired reference number differs from the actual reference number of a word by a single bit) is injected into the system at a suitable point so that a current flows through the sense line threading the word with the desired reference number.

Figure 6:
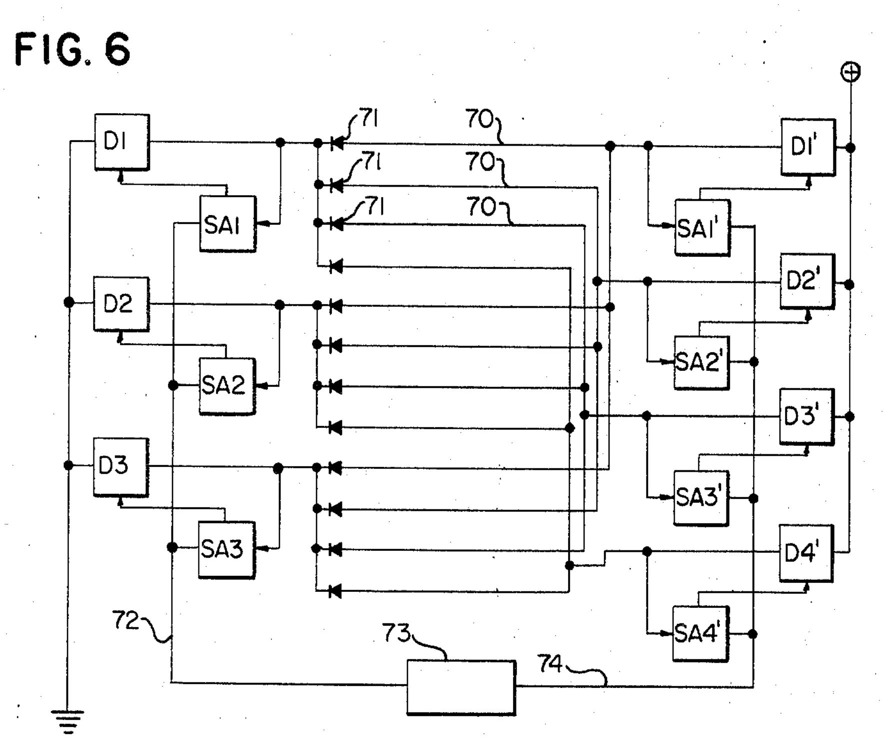
FIGURE 6 shows a sensing system.

Referring to FIGURE 6, such a system is illustrated in a form suitable for use with a matrix of the devices of FIGURE 4. Each of the twelve lines 70 is the word sense line D.R of a single word strip of the type shown in FIGURE 4 and is so arranged that the signals induced on it during interrogation tend to produce a current flow from left to right. Each line 70 contains a respective diode 71 poled to prevent such a current flow. The twelve lines are connected, at their left-hand ends, into three groups, and, at their right-hand ends, into four groups. Each of the groups is connected to a respective detector sense amplifier SA1 to SA3, SA1′ to SA4′, as shown.

The three detector sense amplifiers SA1 to SA3 have their reference inputs connected via common line 72 to an output terminal of waveform generator 73, and the four detector sense amplifiers SA1′ to SA4′ have their reference inputs similarly connected to the other output terminal of waveform generator 73 via line 74. The waveform generator 73 is controlled by the same circuitry that controls the interrogate windings, to produce an output voltage waveform that is smaller than the signal induced on one of the lines 70 by a reference number differing from that stored by a single bit, but, great enough to drive an appreciable current through the detector line threading the word with the desired reference number. Therefore, during searching, a current will flow through line 74, one of detector sense amplifiers SA1′ to SA4′, that one of lines 70 threading the desired word, one of detector sense amplifiers SA1 to SA3, and line 72. All other lines 70 will have signals induced thereon sufficient to prevent forward current ffow therethrough, and the diodes will prevent any reverse current flow.

Each of the detector sense amplifiers SA1 to SA3 and SA1′ to SA4′ feeds a corresponding read driver D1 to D3 and D1′ to D4′. The current through the desired one of the lines 70 will be detected by one of detector sense amplifiers SA1 to SA3 and by one of detector sense amplifiers SA1′ to SA4′, and the corresponding two read drivers will be set. On energization by suitable means, the read drivers will energize the desired one of lines 70 with readout current; the detector sense amplifiers are rendered insensitive and non-conductive during the word readout.

The figure shows a single waveform generator 73 as a device separate from the matrix. It will be realized, however, that it may be more desirable to inject the desired waveform into each of the lines 70 directly. This may conveniently be done by placing a magnetic core of suitable size on each of the lines 70 and driving these cores against a bias current during interrogation to produce the required waveform on each line.

The system of FIGURE 6 may be applied to a matrix of the elements of FIGURE 1 if the read drivers and detector sense amplifiers are provided with separate sets of lines instead of sharing the single set of lines 70 as illustrated. This reduces considerably the technical problems of constructing suitable drivers and amplifiers.

It will be realized that the system of FIGURE 6, besides being applicable only when it is known that no reference number is used twice, requires that interrogation be done with all bits of the desired reference number in parallel. This imposes a limit on the size of the reference number, since the noise signal increases with the number of bits used in interrogation. If a separate detector sense channel is used for each word, however, it is clear that this limitation is no longer valid, for the interrogation may be done serially, i.e., bit by bit, in series-parallel, i.e., by serial blocks of bits, the bits of each block being in parallel, or by a "ripple" process, in which the energization of the interrogate windings is serial but at such speed that the output due to each interrogate winding exends over the corresponding points of several interrogate pulses on adjacent bit lines.

The devices herein described have been provided with windings permitting the maximum versatility in the operations performable; viz., write, interrogate, and read. It will of course be realized that in some circumstances it will not be necessary to perform all of these operations in every memory element in a matrix. Thus some bits in a word may be used solely as part or all of a reference number; in this case there will normally be no need to read these bits. Similarly, some bits in a word may be used solely as data bits, and there will then be no need to interrogate these bits. Again, some bits of the reference numbers may never be changed, and there will then be no need to write in the corresponding elements. In such circumstances, the memory elements may be simplified by the omission of some windings, and sometimes of some apertures also, so that only the required operations can be performed. It is also possible to construct a matrix using different elements for different bit positions, according to the operations which must be performable on the various bit positions.

What is claimed is:

1. In a magnetic storage device having a magnetic flux storage path around an aperture, the improvement comprising a write branch of magnetically permeable material which is magnetically coupled to the storage aperture, comprising:

(a) a plurality of first write apertures, and (b) individual write means including an individual write winding coupled to each of the first write apertures, and (c) a plurality of second write apertures equal in number to the number of first write apertures, each of the second write apertures being positioned intermediate the storage aperture and an associated one of the first write apertures, and (d) an enable means including an enable winding that successively passes through each of the first write apertures in a sense opposite to which it passes through the neighboring first write apertures, the enable winding also successively passing through each of the second write apertures in a sense opposite to which it passes through the neighboring second write apertures, the storage direction of magnetic flux around the storage loop being established by the coincident energization of individual write means and the enable means.

2. A device as in claim 2 wherein the storage direction of the magnetic flux around the storage loop is established by coincident energization of one of the individual write means and the enable means.

3. A device as in claim 2 wherein the enable winding passes through each of the first write apertures and each associated second write aperture in the same sense.

4. A device as in claim 3 wherein there are two first write apertures and two second write apertures.

References Cited

UNITED STATES PATENTS

| | | | |
|---|---|---|---|
| 2,869,112 | 1/1959 | Hunter | 340—174 |
| 2,992,415 | 7/1961 | Bauer | 340—174 |
| 3,019,419 | 1/1962 | Haynes et al. | 340—174 |
| 3,037,125 | 5/1962 | Cole | 307—88 |
| 3,059,224 | 10/1962 | Post | 340—174 |

STANLEY M. URYNOWICZ, Jr., Primary Examiner

K. E. KROSIN, Assistant Examiner